US006456627B1

(12) United States Patent
Frodigh et al.

(10) Patent No.: US 6,456,627 B1
(45) Date of Patent: *Sep. 24, 2002

(54) METHOD FOR COMMUNICATING INFORMATION IN A COMMUNICATION SYSTEM THAT SUPPORTS MULTIPLE MODULATION SCHEMES

(75) Inventors: Carl Magnus Frodigh, Kista; Mikael Höök; Frank Müller, both of Sollentuna, all of (SE); Peter Schramm, Erlangen (DE); Johan Sköld, Åkersberga (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,376

(22) Filed: Aug. 29, 1997

(51) Int. Cl.$^7$ .................................................. H04L 5/12
(52) U.S. Cl. ....................................................... 370/465
(58) Field of Search ............................. 370/204, 206, 370/331–333, 465; 375/259, 261, 279, 281, 340

(56) References Cited

U.S. PATENT DOCUMENTS

| | | | |
|---|---|---|---|
| 5,121,391 A | | 6/1992 | Paneth et al. |
| 5,363,408 A | * | 11/1994 | Paik et al. .................... 375/261 |
| 5,369,637 A | * | 11/1994 | Richardson et al. ......... 370/281 |
| 5,491,457 A | * | 2/1996 | Feher .......................... 332/103 |
| 5,533,004 A | | 7/1996 | Jasper et al. |
| 5,546,464 A | * | 8/1996 | Raith et al. .................... 380/48 |
| 5,577,087 A | | 11/1996 | Furuya |
| 5,602,868 A | | 2/1997 | Wilson |
| 5,610,946 A | * | 3/1997 | Tanaka et al. ............... 375/269 |
| 5,815,531 A | * | 9/1998 | Dent ............................ 375/298 |
| 5,818,827 A | * | 10/1998 | Usui et al. ................... 370/344 |
| 5,822,315 A | * | 10/1998 | Seze et al. ................... 370/337 |
| 5,822,318 A | * | 10/1998 | Tiedemann, Jr. et al. ... 370/391 |
| 5,909,469 A | * | 6/1999 | Frodigh et al. .............. 375/302 |
| 5,940,438 A | * | 8/1999 | Poon et al. ................... 375/222 |
| 5,991,286 A | * | 11/1999 | Labonte et al. .............. 370/337 |
| 6,125,148 A | * | 12/2000 | Frodigh et al. .............. 375/261 |

FOREIGN PATENT DOCUMENTS

| | | |
|---|---|---|
| EP | 533 395 A1 | 9/1992 |
| WO | WO95/28814 | 10/1995 |
| WO | WO96/36146 | 11/1996 |
| WO | WO97/13388 | 4/1997 |

OTHER PUBLICATIONS

Gunmundson et al., "Evolution of the GSM air interface into wideband services," *IEE Colloquium on Advanced TDMA Techniques and Applications*, Oct. 1996, p. 1 of pp. 1–5, XP002086961.
J. Sköld et al., "Cellular Evolution Into Wideband Services," *Proceedings of IEEE Vehicular Technology Conference (VTC)*, May 1996, pp. 485–489.

* cited by examiner

Primary Examiner—Chau Nguyen
Assistant Examiner—Jasper Kwoh
(74) Attorney, Agent, or Firm—Burns, Doane, Swecker & Mathis, L.L.P.

(57) ABSTRACT

A method of communicating control information in systems that support multiple modulation schemes for communicating voice or data and control information. To provide backward compatibility dedicated control channels use the modulation scheme used in current systems, for example GMSK modulation scheme. Traffic channels and associated control channels use linear modulation schemes that have the same symbol rate. The modulation scheme of the associated control channel uses a reduced signal set of the modulation scheme used for traffic channels. Also, an in-band signalling procedure is used to indicate to a receiving station the modulation type, channel coding and speech coding used for a transmitted burst.

44 Claims, 6 Drawing Sheets

METHOD FOR COMMUNICATING INFORMATION IN A COMMUNICATION SYSTEM THAT SUPPORTS MULTIPLE MODULATION SCHEMES

BACKGROUND

This invention generally relates to the field of communication systems and, more particularly, to digital communication systems that supports multiple modulation schemes.

Digital communication systems use a variety of linear and non-linear modulation schemes to communicate voice or data information. These modulation schemes include, Gaussian Minimum Shift Keying (GMSK), Quadrature Phase Shift Keying (QPSK), Quadrature Amplitude Modulation (QAM), etc. GMSK modulation scheme is a non-linear low level modulation (LLM) scheme with a symbol rate that supports a specified user bit rate. In order to increase user bit rate, high-level modulation (HLM) schemes can be used. Linear modulation schemes, such as QAM schemes, may have different level of modulation. For example, 16QAM scheme is used to represent the sixteen variation of 4 bits of data. On the other hand, a QPSK modulation scheme is used to represent the four variations of 2 bits of data. Although 16QAM scheme provides a higher bit rate than QPSK, both of these modulation schemes could have the same symbol rate. Application of modulation schemes, however, differ in many aspects, for example symbol rate and/or burst format, which complicates their support in systems that use multiple modulation schemes.

In wireless digital communication systems, standardized air interfaces specify most of system parameters, including modulation type, burst format, communication protocol, symbol rate, etc. For example, European Telecommunication Standard Institute (ETSI) has specified a Global System for Mobile Communications (GSM) standard that uses time division multiple access (TDMA) to communicate control, voice and data information over radio frequency (RF) physical channels or links using GMSK modulation scheme at a symbol rate of 271 ksps. In the U.S., Telecommunication Industry Association (TIA) has published a number of Interim Standards, such as IS-54 and IS-136, that define various versions of digital advanced mobile phone service (D-AMPS), a TDMA system that uses a Differential QPSK (DQPSK) modulation scheme for communicating data over RF links.

TDMA systems subdivide the available frequency band into one or several RF channels. The RF channels are divided into a number of physical channels corresponding to time slots in TDMA frames. Logical channels are formed from one or more physical channels, where modulation and channel coding schemes are specified. In these systems, the mobile stations communicate with a plurality of scattered base stations by transmitting and receiving bursts of digital information over uplink and downlink RF channels.

The growing number of mobile stations in use today has generated the need for more voice and data channels within cellular telecommunication systems. As a result, base stations have become more closely spaced, with an increase in interference between mobile stations operating on the same frequency in neighboring or closely spaced cells. Although digital techniques gain more useful channels from a given frequency spectrum, there still remains a need to reduce interference, or more specifically to increase the ratio of the carrier signal strength to interference, (i.e., carrier-to-interference (C/I)) ratio. RF links that can handle lower C/I ratios are considered to be more robust than those that only can handle higher C/I ratios.

In order to provide various communication services, a corresponding minimum user bit rate is required. For example, for voice and/or data services, user bit rate corresponds to voice quality and/or data throughput, with a higher user bit rate producing better voice quality and/or higher data throughput. The total user bit rate is determined by a selected combination of techniques for speech coding, channel coding, modulation scheme, and for a TDMA system, the number of assignable time slots per call.

Depending on the modulation scheme used, link quality deteriorates more rapidly as C/I levels decrease. Higher level modulation schemes are more susceptible to low levels of C/I ratio than lower level modulation schemes. If a HLM scheme is used, the data throughput or grade of service drops very rapidly with a drop in link quality. On the other hand, if a LLM scheme is used, data throughput or grade of service does not drop as rapidly under the same interference conditions. Therefore, link adaptation methods, which provide the ability to change modulation and/or coding based on the channel conditions, are used to balance the user bit rate against link quality. Generally, these methods dynamically adapt a system's combination of speech coding, channel coding, modulation, and number of assignable time slots to achieve optimum performance over a broad range of C/I conditions.

One evolutionary path for the next generation of cellular systems is to use high-level modulation (HLM), e.g., 16QAM modulation scheme, to provide increased user bit rates compared to the existing standards. These cellular systems include enhanced GSM systems, enhanced D-AMPS systems, International Mobile Telecommunication 2000 (IMT-2000), etc. A high level linear modulation, such as 16QAM modulation scheme, has the potential to be more spectrum efficient than, for example, GMSK, which is a low-level modulation (LLM) scheme. Furthermore, the use of 16QAM modulation scheme in conjunction with a higher symbol rate significantly increase the user bit rate compared to the GMSK modulation scheme. In this way, the maximum user bit rate offered by an HLM scheme, such as 16QAM modulation scheme, may be more than doubled. Because higher level modulation schemes require a higher minimum C/I ratio for acceptable performance, their availability in the system becomes limited to certain coverage areas of the system or certain parts of the cells, where more robust links can be maintained. However, a system can be planned to provide full coverage for HLM scheme. The modulation schemes provided in a cell may be a mixture of non-linear and linear modulation, with different symbol rates.

Generally, two types of logical channels are defined by air interface standards: control channels (CCH) and traffic channels (TCH). CCHs are used for control signalling such as registration, authentication, call set-up, and the like. TCHs, which are single user channels, are used to handle voice or data communication. For TCHs, some of the standards define various user bit rates.

In GSM systems, control signalling is carried out using different types of CCHs, including dedicated control channels (DCCHs), Broadcast Channels (BCHs), and Common Control Channels (CCCHs). BCHs include Frequency Correction channel (FCCH), Synchronization Channel (SCH), and Broadcast Control Channel (BCCH). The CCCHs include Paging channel (PCH), Access Grant Channel (AGCH) and Random Access Channel (RACCH). DCCHs include Stand-alone Dedicated Control Channel (SDCCH), Fast Associated Control Channel (FACCH), and Slow Associated Control Channels (SACCH).

FCCH indicates a BCCH carrier signal and enables a mobile station to synchronize to its frequency. SCH is used to signal TDMA frame structure in a cell and a Base Station Identity Code (BSIC) that indicates whether a base station belongs to a GSM system or not. BCCH is transmitted during a predefined time slot (e.g., time slot 0 in single carrier base stations) of a downlink RF channel, to provide general information to the mobile stations. SDCCH, which may be transmitted at a time slot adjacent to BCCH, is used for registration, location updating, authentication and call set-up. PCH is a downlink only channel, which is used for informing the mobile station of a network's signaling requirement, for example when the mobile unit is called. AGCH is a downlink only channel used for replies to access requests for assigning a dedicated control channel for a subsequent signaling. RACH is used by a mobile station to request a channel, when it is paged, or when it wants to initiate a call.

The associated control channels, FACCH and SAACH are always associated with traffic channels. Applicable standards specify a number of bits for FACCH and SACCH, which are communicated according to a pre-defined format. SACCH is used for communicating control and supervisory signals associated with traffic channels, including the transmission of parameters corresponding to a measure of bit error rate (BER) or a measure of received signal strength (RSS) at mobile stations. FACCH steals bursts allocated for traffic channels for control requirements, such as hand-over.

Fast signaling procedures are needed to quickly provide signalling information to the receiver. For example, in GSM systems, stealing flags, which are time-multiplexed at pre-defined positions within a burst, are used to distinguish between a FACCH burst and a TCH burst. By reading the stealing flags, the receiver determines the type of logical channels.

In systems that support multiple modulation schemes, specially those which use different symbol rates, handling control information communicated over control channels creates many complications. By introduction of link adaptation algorithms, adaptation of coding and/or modulation scheme becomes more frequent. The frequent link adaptations result in an increased control signalling effort, if, for example, link adaptation commands are transmitted on FACCHs, causing degradation in communication quality. Moreover, it is important to provide backward compatibility between enhanced systems that use high level modulation schemes and current systems that use low level modulation schemes. Therefore, there exists a need for an efficient and simple method for communicating control information in systems that support multiple modulation schemes.

Furthermore, in some systems, there may be a requirement for one burst to carry broadcast information, that is, information directed to all users within a specific group, as well as user specific information. For example, GSM systems can support a General Packet Radio Service (GPRS) that provides packet data service. In GPRS, an uplink status flag (USF), a broadcast information, is communicated on a downlink channel in order to multiplex uplink traffic from different mobile stations. The same burst may contain downlink data transfer directed to a specific user. Hence, a single burst can contain both broadcast and single user information. Also, in Digital European Cordless Telephone (DECT) systems, control information and broadcast information (e.g. cell parameters) are communicated using one portion of each burst and user specific voice or data is communicated using another portion of the burst.

In systems that support multiple modulation schemes, it is difficult to broadcast the same burst to several mobile stations with different demodulation capabilities and different classes of service. Therefore, there exists a need for a system that allows broadcast information within a bursts to be received by different types of mobile stations independent of modulation scheme used for transmitting the burst.

SUMMARY

The present invention that addresses this need is exemplified in a method of communicating control and broadcast information in systems that support multiple modulation schemes.

Briefly, according to the method of the invention, control information are communicated over a control channel using a first modulation scheme. The voice or data is communicated over a traffic channel using a second modulation scheme. The traffic channel has an associated control channel, which may be a fast associated control channel or a slow associated control channel, that uses a third modulation scheme for communicating control information.

According to one embodiment of the present invention, the first modulation scheme is a non-linear modulation scheme, for example, GMSK modulation scheme, and the second and third modulation schemes are linear modulation schemes, for example, 16QAM and QPSK modulation schemes. The second and the third modulation schemes may have the same or different modulation levels. If different, the third modulation scheme, which may be a lower level modulation scheme, uses a reduced signal set relative of the second modulation scheme to communicate control information. Preferably, the second and third modulation schemes have the same symbol rate, the same pulse shaping, and regardless of modulation scheme, the same burst format and the same training sequences.

According to another aspect of the invention, an in-band signalling procedure between the base station and a mobile station communicates signalling information within transmitted bursts. Each burst contains one or more reserved bits at predefined positions. The reserved bits are used to indicate at least one or more of a modulation type, a channel coding, or a speech coding used for the transmitted burst.

According to yet another aspect of the invention, the mobile station and base station communicate voice or data over a traffic channel using a first modulation scheme. If a hand-over is requested during an on-going call, a hand-over procedure is initiated over the fast associated control channel using a second modulation scheme. Then, the communication over the traffic channel is resumed using the first modulation scheme, after the hand-over is complete.

According to still another aspect of the invention, a method of communication between a base station and a mobile station transmits a burst that communicates at least two types of information. A first type of information are modulated using a first linear modulation scheme, and a second type of information are modulated using a second linear modulation scheme that uses a reduced signal set of the first modulation scheme. The first and second types of information may be a first user specific data and a second user specific data, respectively. Alternatively, the first type of information may be user specific data, and the second type of information may be broadcast information.

Other features and advantages of the present invention will become apparent from the following description of the preferred embodiment, taken in conjunction with the accompanying drawings, which illustrate, by way of example, the principles of the invention.

DETAILED DESCRIPTION

Figure 1:
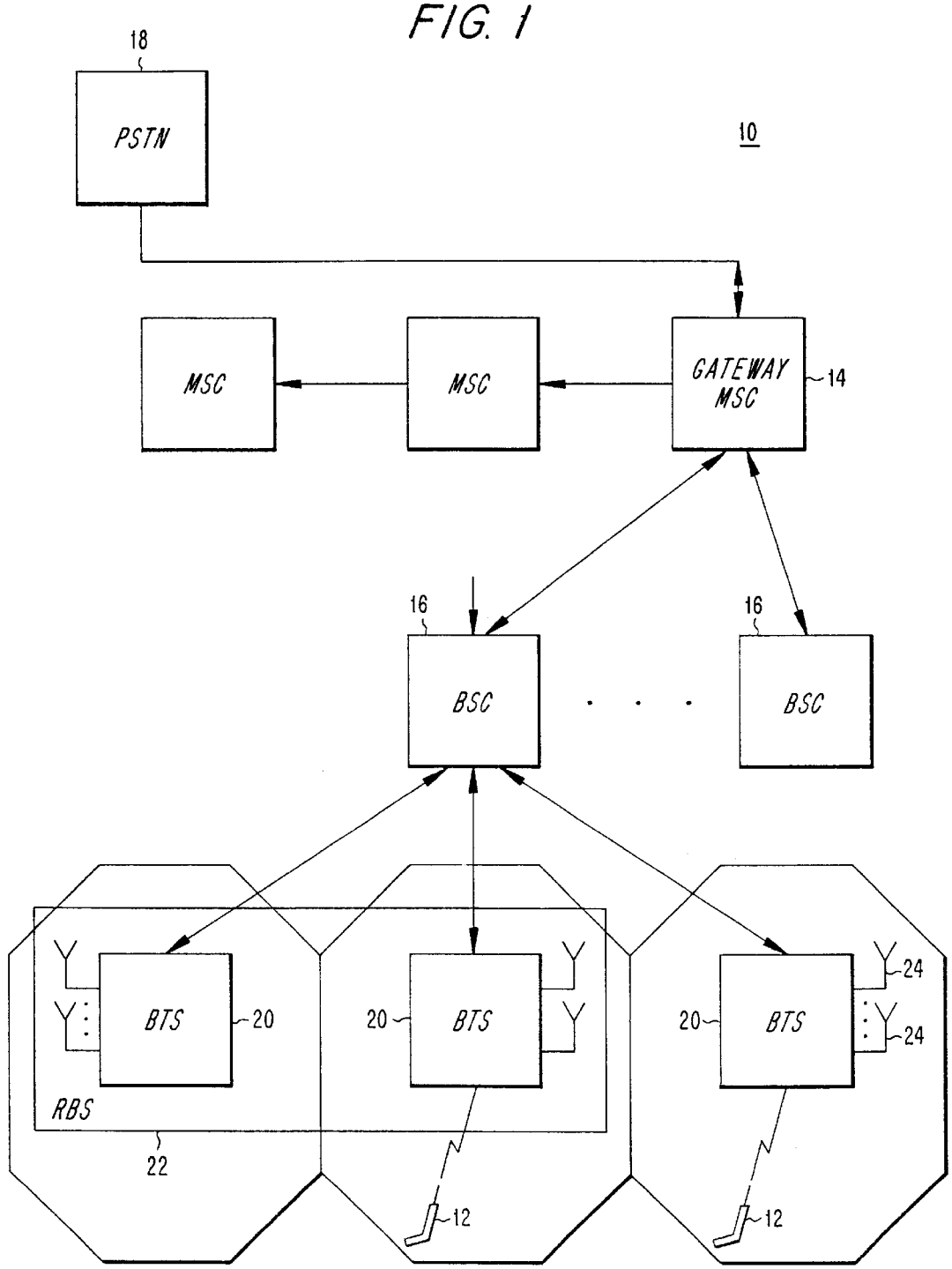
FIG. 1 is a block diagram of a communication system which advantageously uses the present invention.

Referring to FIG. 1, a communication system 10 according to an exemplary embodiment of the present invention supports multiple modulation schemes. In an exemplary embodiment of the invention, the system 10 supports three modulation schemes: a first LLM (LLM1) scheme, a second LLM (LLM2) scheme, and a HLM scheme. In an exemplary embodiment, the first LLM (LLM1) scheme is a non-linear modulation scheme, such as GMSK modulation scheme used in GSM systems. A second LLM (LLM2) scheme is a linear modulation scheme, such as QPSK. Finally, the HLM modulation scheme is a higher level linear modulation schemes, for example, 16QAM scheme. LLM2 and HLM schemes have the same symbol rate that is different from the symbol rate of LLM1 scheme.

The mode of operation of GSM communication systems is described in European Telecommunication Standard Institute (ETSI) documents ETS 300 573, ETS 300 574 and ETS 300 578, which are hereby incorporated by reference. Therefore, the operation of the GSM system is described to the extent necessary for understanding of the present invention. Although, the present invention is described as embodied in a GSM system, those skilled in the art would appreciate that the present invention could be used in a wide variety of other digital communication systems, such as those based on PDC or D-AMPS standards and enhancements thereof. The present invention may also be used in CDMA or a hybrid of CDMA and TDMA communication systems.

The communication system 10 covers a geographical area that is subdivided into communication cells, which together provide communication coverage to a service area, for example, an entire city. Preferably, the communication cells are patterned according to a cell pattern that allows some of the spaced apart cells to use the same uplink and downlink RF channels. In this way, the cell pattern of the system 10 reduces the number of RF channels needed to cover the service area. The system 10 may also employ frequency hopping techniques, for example, to avoid "deadspots."

Figures 2A, 2B:
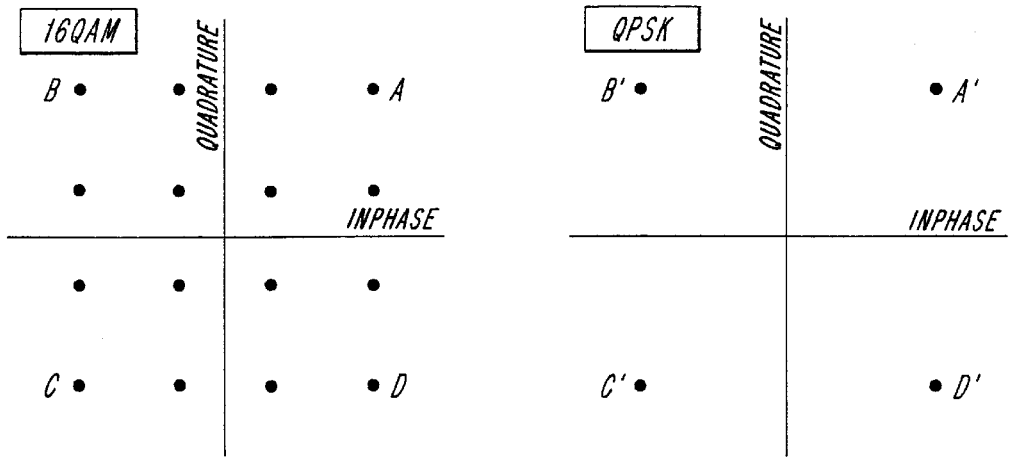
FIGS. 2 (a) an 2(b) are diagrams of modulation constellations of a 16QAM and QPSK modulation schemes, respectively.

Referring to FIGS. 2(a) and 2(b), the signal sets in modulation constellations of 16QAM scheme and QPSK scheme are shown, respectively. The outer signal points of 16QAM scheme are shown by points A, B, C, and D, and the signal points of QPSK scheme are shown by points A', B', C', and D'. QPSK scheme can be viewed as having a reduced signal set relative to 16QAM scheme. If the symbol rates of QPSK and 16QAM schemes are the same, a 16QAM demodulator can demodulate the reduced signal set of QPSK modulation scheme by using exclusively the signal points A, B, C and D of 16QAM scheme. Consequently, the same demodulator can be used to demodulate signals that are modulated with QPSK and 16QAM schemes, if the same pulse shaping and burst format is used for both of these schemes. This arrangement significantly facilitates demodulation switching between QPSK and 16QAM schemes, for example, during link adaptation. One such demodulation method is described in a concurrently filed patent application, U.S. patent application Ser. No. 08/921,374 now Pat. No. 6,125,148 titled "A METHOD FOR DEMODULATING INFORMATION IN A COMMUNICATION SYSTEM THAT SUPPORTS MULTIPLE MODULATION SCHEMES," which is hereby incorporated by reference.

In one aspect, the present invention takes advantage of the ease of demodulation switching with modulation schemes that have the same symbol rate, pulse shaping, burst format, and where one modulation schemes has a reduced signal set relative to the other, to effectively communicate control information in systems that use multiple modulation schemes. The present invention communicates control information between a BTS 20 and a mobile station 12 over control channels (CCHs) and communicates voice or data over traffic channels (TCHs). Those CCHs that are associated with TCHs, for example FACCH and SAACH, are herein defined as associated control channels. The remaining CCHs, which are not associated with TCHs, are herein defined as non-associated control channels. The non-associated control channels include all Broadcast Channels (BCHs) (e.g., Frequency Correction channel (FCCH), Synchronization Channel (SCH), and Broadcast Control Channel (BCCH)), all Common Control Channels (CCCH) (e.g., Paging channel (PCH), Access Grant Channel (AGCH) and Random Access Channel (RACCH)), and Stand-alone Dedicated Control Channel (SDCCH).

In order to maintain backward compatibility with existing GSM systems, the system 10 communicates control information over non-associated control channels using a first modulation scheme, preferably, GMSK modulation scheme. The system 10 communicates control information over associated control channels, i.e., FACCH or SACCH, using a second modulation scheme, such as QPSK or 16QAM, that is different from the first modulation scheme.

Voice and data are communicated over TCHs using a third modulation scheme, which is different from the first and second modulation schemes. For example, if possible, the third modulation scheme is preferably HLM scheme, which may be a 16QAM modulation scheme. Otherwise, voice or data are communicated using LLM2 scheme, which may be a QPSK modulation scheme. Preferably, the second modulation scheme of the associated control channels and the third modulation scheme of TCHs has the same symbol rate, even though their levels of modulation may be different, or they may be the same. In an exemplary embodiment, the second modulation scheme of the associated control channels is the second lower level modulation scheme LLM2, which is a QPSK modulation scheme. The HLM and LLM2 modulation schemes use the same pulse shaping, the same symbol rate and burst format. LLM2 scheme, however, uses a reduced signal set of the HLM scheme. As described above, this allows for the use of an identical demodulator at the receivers to demodulate outer signal points of 16QAM scheme and signal points of, QPSK modulation scheme, which is used to communicate control information on associated control channels. The identical demodulator demodulates signals that are communicated using HLM scheme. Because LLM2 scheme uses a reduced signal set of HLM scheme, HLM demodulator can also demodulate LLM2 modulated signals by detecting the outer signal points of HLM modulation constellations.

The system 10 is designed as a hierarchical network with multiple levels for managing calls. Using an allocated set of uplink and downlink RF links, mobile stations 12 operating within the system 10 participate in calls using allocated time slots. At a high hierarchal level, a group of Mobile Service Switching Centers (MSCs) 14 are responsible for the routing of calls from an originator to a destination. In particular, they are responsible for setup, control and termination of calls. One of the MSCs 14, known as the gateway MSC, handles communication with a Public Switched Telephone Network (PSTN) 18, or other public and private networks. The communication system 10 uses the present invention to provide for link adaptation, when mobile stations 12 within a cell move within coverage areas that support one or more of LLM1, LLM2, HLM schemes.

At a lower hierarchical level, each one of the MSCs 14 are connected to a group of base station controllers (BSCs) 16. The primary function of a BSC 16 is radio resource management. For example, based on reported received signal strength at the mobile stations 12, the BSC 16 determines whether to initiate a hand-over. Under the GSM standard, the BSC 16 communicates with a MSC 14 under a standard interface known as the A-interface, which is based on the Mobile Application Part of CCITT Signaling System No. 7.

At a still lower hierarchical level each one of the BSCs 16 controls, a group of base transceiver stations (BTSs) 20. Each BTS 20 includes a number of TRXs that use the uplink and downlink RF channels to serve a particular common geographical area. The BTSs 20 primarily provide the RF links for the transmission and reception of data bursts to and from the mobile stations 12 within their designated cell. In an exemplary embodiment, a number of BTSs 20 are incorporated into a radio base station (RBS) 22. The RBS 22 may be configured according to a family of RBS-2000 products, which is offered by Ericsson, the assignee of the present invention.

Figure 3:
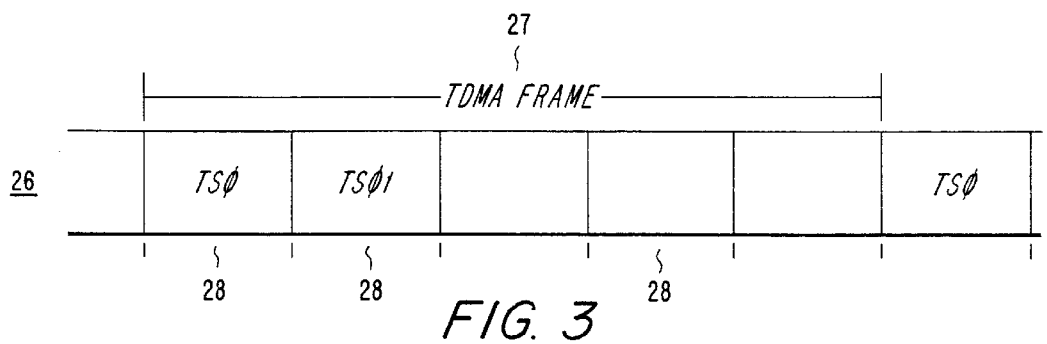
FIG. 3 is a diagram of a subdivided RF channel that is used in the communication system of FIG. 1.

With reference to FIG. 3, an RF channel 26 (uplink or downlink) is divided into repetitive time frames 27 during which information are communicated. Each frame 27 is further divided into time slots 28 that carry packets of information. Speech or data is transmitted during time slots designated as traffic channels (TCH$_1$, . . . ,TCH$_n$). All signaling functions pertaining to call management in the system, including initiations, hand overs, and termination are handled via control information transmitted over control channels.

In order to provide backward compatibility with GSM systems, the system 10 uses GMSK modulation scheme for communicating control information over the non-associated control channels. The mobile stations 12 use the slow associated control channels (SACCHS) to transmit associated control signals, such as an RX-LEV signal, which corresponds to the received signal strength at the mobile station 12 and RX-QUAL signal, which is a measure of various levels of bit error rate at the mobile station 12, as defined by the GSM standard. Fast associated control channels (FACCHs) perform control functions, such as hand-overs, by stealing bursts allocated for TCHS. Fast signalling procedure is used to indicate whether a burst contains control or voice and/or data. In the present invention, the FACCHs and SACCHs may use LLM2 or HLM modulation schemes to communicate control information independent from the modulation scheme used for TCHS, if LLM2 and HLM are supported.

The BSC 16 instructs the RBS 22 based on measures of channel characteristics of RF links between mobile stations 12 to the RBS 22. As described later in detail, the channel characteristics may be measured based on a number of parameters, including received signal strength at the mobile station 12, bit error rate at the mobile station 12, the multipath propagation property of the uplink RF channel, for example, time dispersion, or a combination of them.

The system 10 carries out the transmission of information during a time slot in a burst that contain a predefined number of coded bits. The GSM specification defines various types of bursts: normal burst (NB), frequency correction burst (FB), synchronization burst (SB), access burst (AB), and dummy burst. The normal burst, which has a duration of 576 µs, is used both during the traffic and some control signalling channels. The remaining bursts are primarily used for access and maintaining signal and frequency synchronization within the system.

Figure 4:
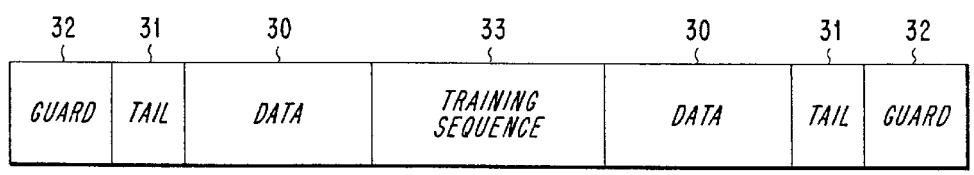
FIG. 4 is a diagram of a normal transmission burst transmitted on the RF channel of FIG. 2.

As shown in FIG. 4, a normal burst 29 includes two separate data portions 30 during which digital data bits are communicated. The normal burst also includes tail and guard sections 31 and 32 as shown. Among other things, the guard section 32 is used to allow for up-ramping of the burst and for down-ramping of the bursts. The tail section 31 is used for demodulation purposes. All burst transmissions, except dummy burst transmissions, include training sequences. The training sequences are patterned with predefined autocorrelation characteristics. During demodulation process, the auto correlation characteristic of the training sequence helps in the synchronization of the received bit sequences over an RF channel. In the normal burst 29, a training sequence 33, is positioned in the middle of the burst between its data portions.

In order to compensate for propagation delays, the communication system 10 uses a time alignment process by which the mobile stations 12 align their burst transmissions to arrive at the BTSs 20 in proper time relationship relative to other bursts transmissions. As described later, the mobile station 12 and the RBS 22 incorporate equalizers, which correlate received baseband bit sequences over the uplink or downlink RF channels with the training sequences, to provide correlator responses that correspond to the properties of multipath propagation. Based on the correlator responses, the receiver section of the BTS 20 generates a timing advance (TA) parameter, which corresponds to a propagation delay over the uplink RF channel. The mobile station 12 uses the TA parameter, which is transmitted from the RBS 22, for advancing or retarding its burst transmissions relative to a time reference.

Figure 5:
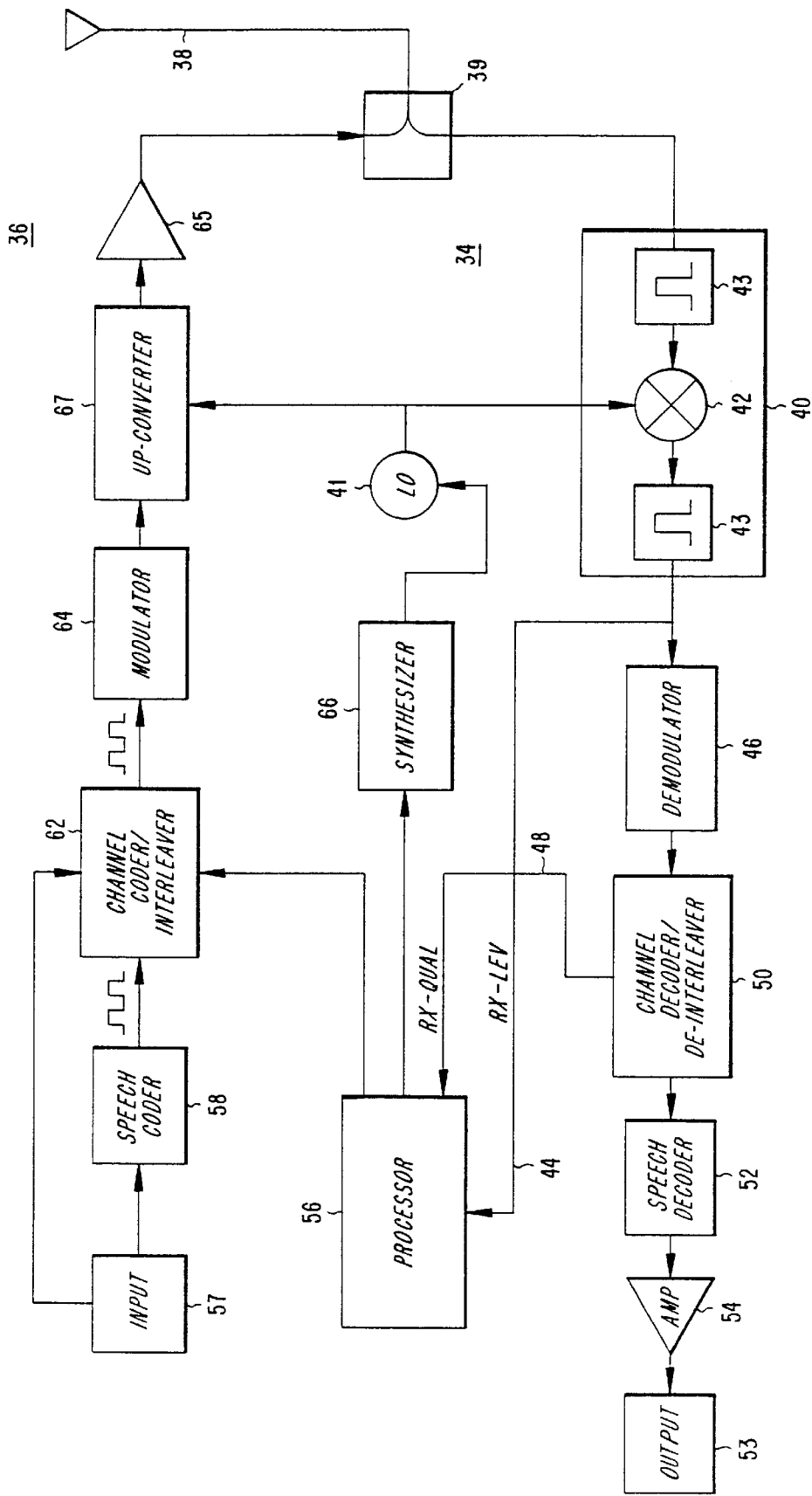
FIG. 5 is a block diagram of a mobile station used in the communication system of FIG. 1.

With reference to FIG. 5, the block diagram of a mobile station 12 is shown. The mobile station 12 includes a receiver section 34 and a transmitter section 36, which are coupled to an antenna 38 through a duplexer 39. The antenna 38 is used for receiving and transmitting RF signals to and from the BTS 20 over allocated uplink and downlink RF channels. The receiver section 34 includes an RF receiver 40, which includes a local oscillator 41, a mixer 42, and selectivity filters 43 arranged in a well known manner, for down-converting and demodulating received signals to a baseband level. The RF receiver 40, which is tuned by the local oscillator 41 to the downlink channel, also provides an RX-LEV signal on line 44 that corresponds to the received signal strength at the mobile station 12.

The RF receiver provides a baseband signal to a demodulator 46 that demodulates coded data bits representing the received speech, data and signaling information. Depending on the type of mobile station 12, the demodulator 46 can support one or more demodulation schemes corresponding to LLM1, LLM2, and HLM schemes. For example, the demodulator of a mobile station 12 subscribed to an operator that supports LLM1 scheme may be capable of demodulating LLM1 modulated signals only. On the other hand, the demodulator of a mobile station 12 subscribed to an operator that supports all of the three modulation schemes is preferably capable of demodulating LLM1, LLM2, and HLM schemes.

As described above, the demodulator 46 includes an equalizer (not shown) that processes the coded bit pattern disposed on the training sequences, to provide correlator response that are used for predictive demodulation of the baseband signal. The equalizer uses the correlator responses to determine the most probable bit sequence for demodulation. As defined by the GSM specification, a channel decoder/interleaver 50 also provides an RX-QUAL signal on line 48, which is a measure of various levels of bit error rate at the mobile station 12. The mobile station 12 reports the RX-QUAL signal and the RX-LEV signal to the BSC 16 on a SACCH channel.

Preferably, bursts modulated according to LLM2 and HLM scheme, i.e., 16QAM and QPSK schemes, use the same pulse shaping, symbol rate and burst format, and use the same training sequences. Both modulation schemes use the same signal points to modulate the training sequences. For example, a 16 QAM modulator modulates the training sequence using outer signal points A, B, C, and D, (shown in FIG. 2(a)). Similarly, a QPSK modulated signal, which has a reduced signal set relative to 16QAM modulated signal, uses signal points A', B', C', and D' (shown in FIG. 2(a)) for transmitting the training sequence. Although the training sequence used in bursts that communicate control information is the same as the training sequence of bursts that communicate of voice or data, in the present invention, the modulation scheme used for communicating the training sequence of a control channel is different from that of a TCH. Similarly, the in-band signalling information as well as stealing flags are modulated using the outer signal point of the linear modulation constellation. As described before, the mobile station 12 can use the same demodulator, i.e., a 16QAM demodulator, to demodulate the in-band signalling information, as well as the training sequences. This arrangement significantly facilitates decoding of both the training sequence and in-band signalling information of HLM and LLM2 modulated signals.

The channel decoder/de-interleaver 50 decodes and de-interleaves the demodulated signal. The speech data bits are applied to a speech decoder 52 that decodes the speech pattern using one of a variety of speech decoding algorithms. After decoding, the speech decoder 52 applies an analog speech signal to a output device 53, e.g., a speaker, via an audio amplifier 54. The channel decoder 50 provides the decoded data and signalling information to a microprocessor 56 for further processing, for example, displaying the data to a user.

The transmitter section 36 includes an input device 57, e.g., a microphone and/or keypad, for inputting voice or data information. According to a specified speech/data coding techniques, a speech coder 58 digitizes and codes the voice signals according to a variety of supported speech coding schemes. A channel coder/interleaver 62 codes the uplink data according to a specified coding/interleaving algorithms, which improves error detection and correction at the BTS 12. The channel coder/interleaver 62 provides an uplink baseband signal to a modulator 64. The modulator 64 modulates the uplink baseband signal according to one or more of supported modulation schemes. Similar to the demodulator 46, the modulator 64 of the mobile station 12 may support one or more of LLM1, LLM2, and HLM schemes.

The modulator 64 applies the coded signal to an up-converter 67, which receives a carrier signal from the up-converted signal local oscillator 41. An RF amplifier 65 amplifies the up-converted signal for transmission trough the antenna 38. A well known frequency synthesizer 66, under the control of the microprocessor 56, supplies the operating frequency information to the local oscillator 41. The microprocessor 56 causes the mobile station 12 to transmit the RX-QUAL and RX-LEV parameters to the RBS 22 over the SACCH.

Figure 6:
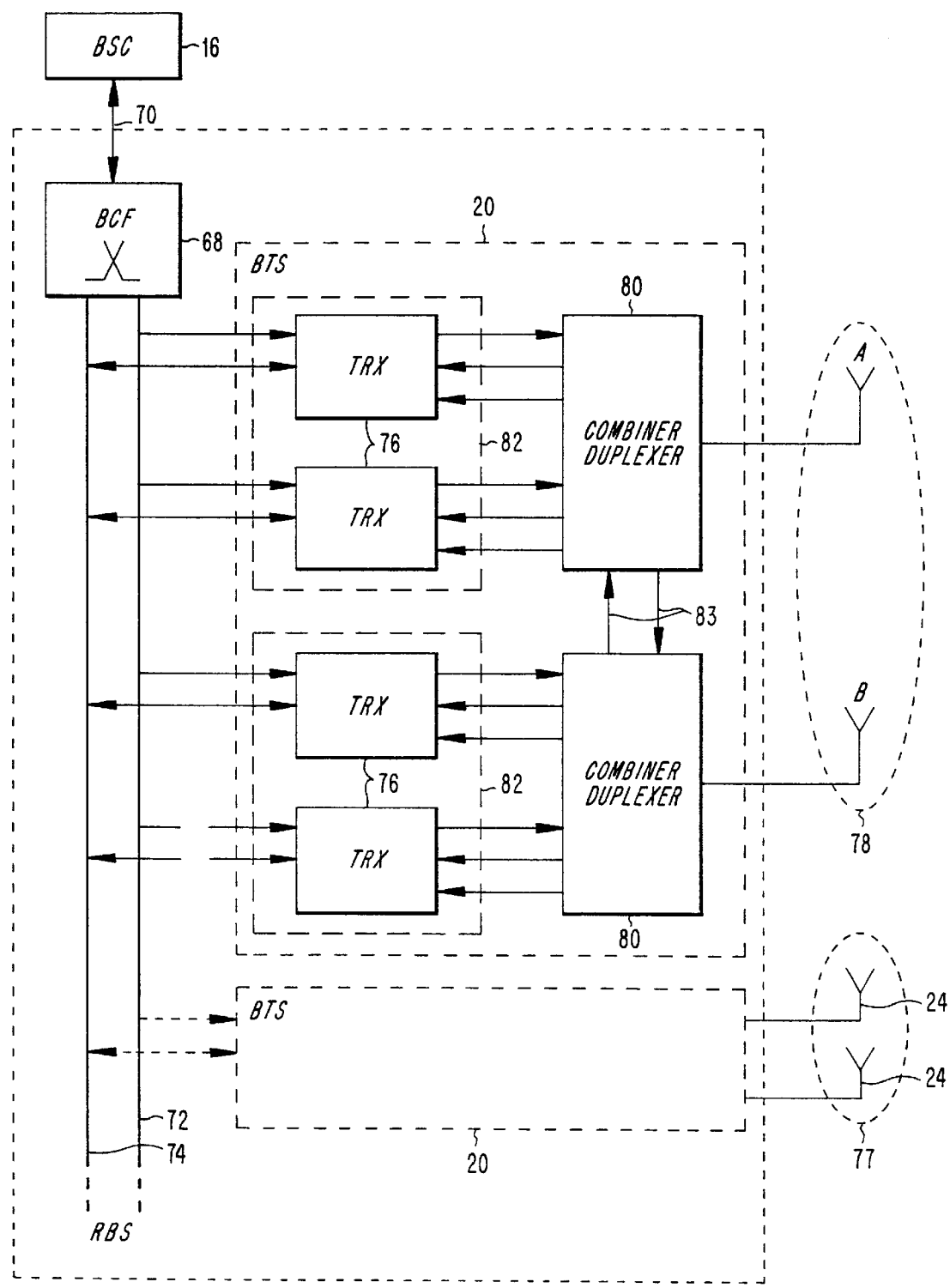
FIG. 6 is a block diagram of a radio base station used in the communication system of FIG. 1.

Referring to FIG. 6, an exemplary block diagram of the RBS 22 is shown to include a plurality of BTSs 20 that serve different geographical areas. Through a timing bus 72, the BTSs 20 are synchronized with each other. Voice and data information are provided to and from the RBS 22 through a traffic bus 74 that may be coupled, through the A-bis interface, to a public or private voice and data transmission line, such as a T1 line (not shown). Each BTS 20 includes TRXs 75 and 76 that communicate with the mobile station 12. As shown, two antennas designated as 24A and 24B are spaced accordingly to cover cells 77 and 78. The TRXs 76 are coupled to the antennas 24 through combiner/duplexers 80 that combine downlink transmission signals from the TRXs 76 and distribute the uplink received signals from the mobile station 12. The RBS 22 also includes a base station common function (BCF) block 68 that controls the operation and maintenance of the RBS 22.

Figure 7:
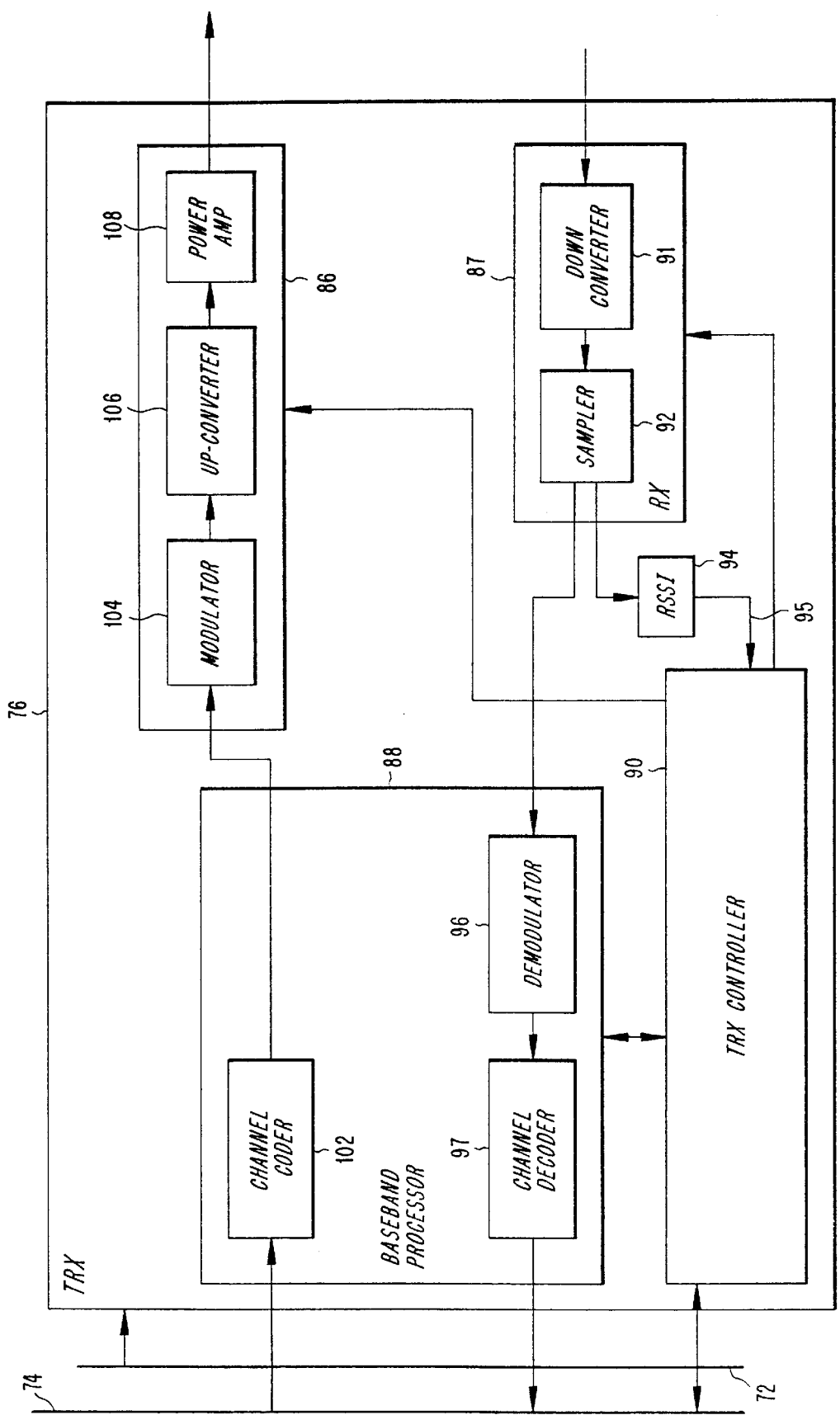
FIG. 7 is a block diagram of a radio transceiver used in the base station of FIG. 6.

Referring to FIG. 7, a block diagram of a TRX 76 is shown. The TRX 76 includes a transmitter section 86, a receiver section 87, a baseband processor 88 and a TRX controller 90. Through a corresponding antenna 24 (shown in FIG. 6), the receiver section 87 receives uplink signals from the mobile station 12. A down-conversion block 91 down-converts the received signal. After down-converting the received signals, the receiver section 87 samples its phase and magnitude, via a sampler block 92, to provide received bit sequence to the baseband processor 88. An RSSI estimator 94 provides an RSSI signal on line 95, which is a measure of the received signal strength. The RSSI estimator 94 may also measure noise disturbance levels during idle channels. The TRX controller 90, which is coupled to the traffic bus 74, processes the commands received from the BSC 16 and transmits TRX related information, such as various TRX measurements, to the BSC 16. Under this arrangement, the TRX 76 periodically reports the RSSI signal and noise disturbance levels to the BSC 16.

The baseband processor 88 includes a demodulator 96 that receives uplink baseband data from the receiver section 87. The demodulator 96 generates correlator responses that are processed in a well known manner to retrieve the uplink baseband data. The demodulator 96 may support demodulation of signals that are modulated using one or more of LLM1, LLM2 or HLM schemes. The uplink baseband data is applied to a channel decoder 97 that decodes the baseband signal according to one or more supported channel decoding scheme. The channel decoder 97 places the decoded baseband signal on the traffic bus 78, for further processing by the BSC 16.

When transmitting downlink baseband data, the baseband processor 88 receives properly coded data or digitized speech information from the BSC 16 over the traffic bus 74 and applies them to a channel coder 102 that codes and inter-leaves speech and data according to one or more of supported channel coding schemes. The transmitter section includes a modulator 104 that modulates the supplied data bits according to one or more of LLM1, LLM2, and HLM schemes. The modulator 104 provides downlink baseband signals to an up-conversion block 106 for up-conversion. A power amplifier 108 amplifies the up-converted signal for transmission through a corresponding antenna.

In an exemplary operation, the system 10 establishes a call between a mobile station 12 and a BTS 20 using LLM1 on the SDCCH. The system 10, for example, uses one or a combination of the RX-QUAL, RX-LEV, or TA parameters, which are measures of channel characteristic of the RF link, to decide whether a inter-cell hand-over, an intra-cell hand-over, or a link adaptation procedure should be initiated or not. The initiation of a link adaptation procedure within coverage areas that support LLM1, LLM2, and HLM schemes is based on the channel characteristic of the RF link as well. The BSC 16 compares the channel characteristic parameter to corresponding thresholds to determine whether to perform a link adaptation, or an intra-cell or inter-cell hand-over.

When a call is requested, TCHs are allocated based on the capabilities of both the mobile station 12 and BTS 20 to use LLM2 and HLM schemes. When only LLM1 is supported, TCHs use LLM1. If the system 10, including the mobile station 12, can support LLM2 or HLM schemes, allocated TCHs use LLM2 or HLM schemes. If link quality is sufficient for HLM scheme, the system 10 uses HLM scheme for communicating over the allocated TCHs. Otherwise, the system 10 uses LLM2 scheme. After hand-over is completed, a link algorithm for switching modulation within a cell continues. A concurrently filed patent application, U.S. patent application Ser. No. 08/921,319 now Pat. No. 5,909,469 titled "A LINK ADAPTATION METHOD FOR LINKS USING MODULATION SCHEMES THAT HAVE DIFFERENT SYMBOL RATES", which is hereby incorporated by reference, discloses a link adaptation procedure that may preferably be used to perform link adaptation in system 10.

While a call is ongoing, voice or data are communicated over TCHs using HLM scheme, when possible. If the BTS 20 detects a hand-over condition based on the channel characteristic of the RF link, according to one aspect of the invention, a method of communication between the mobile station 12 and BTS 20 initiates a hand-over on an associated control channel using LLM2 scheme. After the hand-over is complete, the mobile station 12 and the BTS 20 resume communication over TCH using HLM scheme. In this way, the present invention provides an easy hand-over method because the hand-over commands over FACCHs are communicated using reduced signal sets of LLM2 scheme that are easily demodulated by the same demodulator used for demodulating HLM modulated voice or data over TCHs.

For the sake of maintaining compatibility with existing systems, the number of bits in one FACCH block that should be transmitted must remain the same. In an exemplary embodiment, a higher level modulation scheme, like 16QAM modulation scheme, with a significantly higher maximum number of bits can be used. Using the greater bit rate provided by 16QAM modulation scheme, a greater number of redundancy bits can be used to increase communication reliability of control information.

According to another aspect of the invention, the system 10 uses LLM2 to transmit control information over associated control channels, e.g., FACCH, independent of the modulation scheme used on TCHs, which may be one of LLM2 or HLM schemes. LLM2 scheme, which has a lower level of modulation relative to HLM scheme, uses reduced signal set of HLM modulation scheme to communicate control information over associated control channels. For example, LLM2 scheme may be QPSK modulation scheme and HLM scheme may be a 16QAM modulation scheme. In this way, both QPSK modulated signals and 16QAM modulated signals can be demodulated using a 16QAM demodulator. Consequently, data reliability over associated control channels is improved compared to TCHs by increased Euclidean distance between signal points of modulation, that is, QPSK modulation scheme compared to 16QAM scheme.

Furthermore, the system 10 uses stealing flags to indicate whether a transmitted burst contains voice and data or control information. The stealing flags contained in the transmitted burst may be transmitted using either QPSK or 16QAM modulation schemes. In case they are transmitted using QPSK modulation scheme, no additional bit is transmitted for stealing flags over TCHs. The advantage of transmitting the stealing flags using, QPSK modulation scheme, i.e., LLM2 scheme, is that they can be demodulated and evaluated independent of the modulation applied to voice or data.

Generally, SACCHs are transmitted on the same carrier as TCHs. The position of SACCHs is well defined so that the receiver is able to demodulate SACCH bursts. In yet another aspect of the invention, LLM2 scheme is used for transmissions over SACCHs. In this way, the demodulation process is simplified, because the symbol rates of LLM2 and HLM are the same. The present invention may also use LLM2 scheme for some of the non-associated control channels, such as SDCCH, PCH and AGCH, in the same way as that used for the SACCHs.

As described above, in-band signalling procedure places control signals in each burst, i.e., time-slot for TDMA systems, on pre-defined positions. According to another aspect of the present invention, in-band signaling is used to indicate at least one or more of a modulation type, a channel coding, and/or a speech coding used for a transmitted burst. The present invention reserves a number of bits (or symbols), similar to the stealing flags, as in-band signaling information to indicate which modulation scheme or channel coding scheme or speech coding is used in the transmitted burst. The reserved symbols or bits have a predefined location within the burst. In order to use the same demodulation scheme as that used to demodulate LLM2 or HLM modulated voice or data, the reserved bits or symbols are preferably modulated using LLM2 scheme. In this way, the receiver can demodulate and evaluate the in-band signaling information independent of the modulation scheme used for voice or data by using identical demodulation schemes. Therefore, the present invention may modulate in-band signalling information and voice or data using separate modulation schemes, but it demodulates them using the same demodulation scheme.

Figure 8:
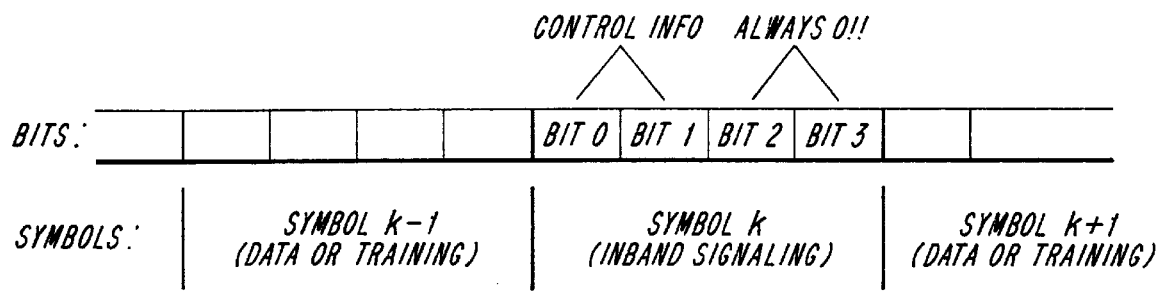
FIG. 8 shows a diagram of the format of bits and symbols of a transmitted burst.

Referring to FIG. 8, a frame containing bits and symbols within a burst is depicted. Each 16QAM symbol comprises four bits. For transmission of data symbols, all four bits contain information that are estimated at receivers. For symbols that are used for in-band signaling, only two bits, bits 1 and 2, bear signalling information, the other two bits, bits 3 and 4, are set to zero. According to in-band signalling method of the invention, only the four outer signal points (in the corners of the 16QAM constellation) are used.

Figure 9:
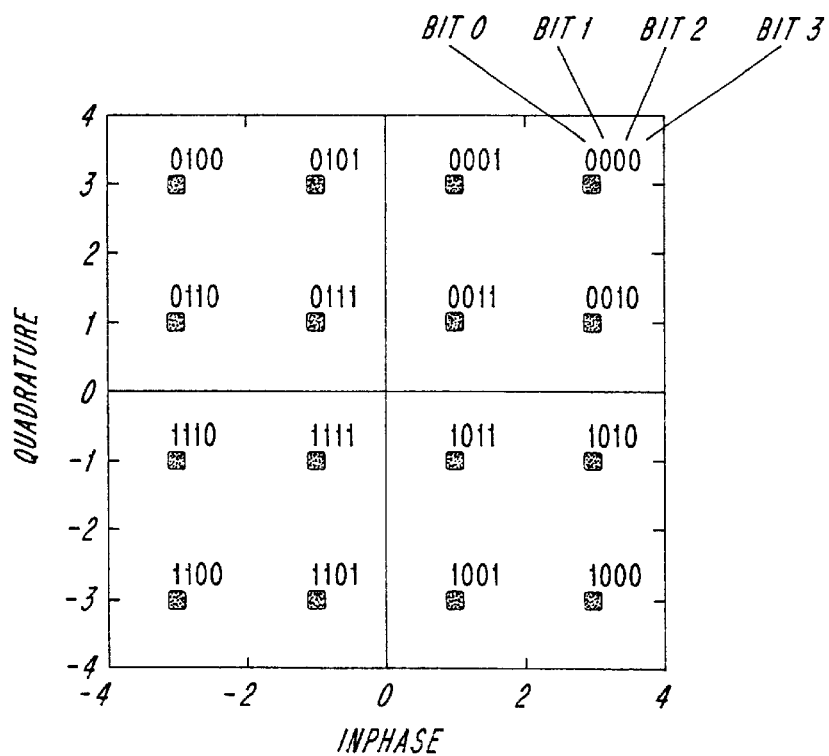
FIG. 9 shows a diagram of a mapping scheme used for demodulating the transmitted bursts of FIG. 8.

Referring to FIG. 9, a diagram of a mapping scheme used for demodulation of LLM2 and HLM modulated symbols is shown. As shown in FIG. 9, all four outer signal points have the bit pattern 'xy00', where x and y are equivalent to the bits 0 and 1 of the symbol used for in-band signaling. In this way, in-band signaling is efficiently used for transmission of fast control information, for example, to indicate the used modulation scheme.

According to another aspect of the invention, the in-band signalling procedure reserves symbols or bits within a burst for communicating at least two types of information. The different types of information may be data directed to different users or they may be broadcast and user specific information. The system 10 transmits a burst that communicates the two sets of information by modulating a first set of information using a first modulation scheme and modulating a second set of information using a second modulation scheme that is different from the first modulation scheme. According to this aspect, the second modulation scheme, which may be linear or non-linear, uses a reduced signal set of the first modulation scheme. In case of linear modulation scheme, the first modulation scheme may be 16QAM scheme, and the second modulation scheme may be QPSK scheme. In case of non-linear modulation, the first modulation scheme may be 4GMSK scheme, and the second modulation scheme may be GMSK. In this way, the modulation scheme can be optimized according to the link quality and class of each user.

In an exemplary embodiment, the system 10 supports GPRS extension of GSM, which provides packet data service to users. Under this arrangement, each burst contains both broadcast information and user specific information. The broadcast information may, for example, be a USF and user specific information may include packets of user data. This aspect of the invention uses a first modulation schemes for transmitting broadcast information and a second modulation scheme for transmitting user specific information. Preferably, the first modulation scheme, which is a linear modulation scheme, uses a reduced signal set of the second modulation scheme, which has a higher level of modulation than the first modulation scheme. For example, the first modulation scheme is LLM2 scheme, e.g. QPSK scheme, and the second modulation scheme is HLM scheme, i.e., 16QAM modulation schemes. Also, the first and second modulation schemes have the same symbol rate and the same pulse shaping and use the same burst format. As described before, the LLM2 modulated broadcast information can be demodulated by all receivers that are capable of demodulating HLM. Consequently, the present invention ensures that maximum coverage for broadcasting within cells is obtained where either LLM2 or HLM can be used.

From the foregoing it would be appreciated that the present invention significantly facilitates communication of control information in a system that supports multiple modulation schemes by reducing the overhead associated with demodulation of control information, while providing backward compatibility. The present invention takes advantage of higher data throughput provided by higher level modulation schemes to improve reliability when control information are communicated. With modulation schemes that have the same symbol rate, same pulse shaping and burst format, the present invention uses in-band signalling procedure to identify modulation, channel coding and speech coding in transmitted burst. In this way, the present invention improves communication quality of systems that support multiple modulation schemes.

Although the invention has been described in detail with reference only to a preferred embodiment, those skilled in the art will appreciate that various modifications can be made without departing from the invention. Accordingly, the invention is defined only by the following claims which are intended to embrace all equivalents thereof.

What is claimed is:

1. A method of communication between a base station and a mobile station comprising the steps of:
communicating control information over a non-associated control channel;
communicating voice or data over a traffic channel;
using a first modulation scheme to communicate the control information over the non-associated control channel; and
using a second modulation scheme to communicate the voice and data over the traffic channel, wherein the traffic channel has an associated control channel that uses a third modulation scheme for communicating associated control information.

2. The method of claim 1, wherein the first modulation scheme is a non-linear modulation scheme and the second and third modulation schemes are linear modulation schemes.

3. The method of claim 2, wherein the second and the third modulation schemes have the same symbol rate.

4. The method of claim 3, wherein the associated control channel is a fast associated control channel.

5. The method of claim 3, wherein the associated control channel is a slow associated control channel.

6. The method of claim 2, wherein the third modulation scheme has a lower level of modulation than the second modulation scheme.

7. The method of claim 6, wherein the third modulation scheme uses a reduced signal set of the second modulation scheme.

8. The method of claim 2, wherein the second and third modulation schemes use the same pulse shaping.

9. The method of claim 2, wherein the second and third modulation schemes use the same burst format.

10. The method in claim 2, wherein the second and third modulation schemes use the same training sequences.

11. The method in claim 2, wherein the first modulation scheme is GMSK modulation scheme, the second modulation scheme is a QAM modulation scheme, and the third modulation scheme is a QPSK modulation scheme.

12. A method of communication between a base station and a mobile station comprising:
communicating control information over a non-associated control channel using a first modulation scheme;
communicating voice or data over a traffic channel using a second modulation scheme; and
communicating in-band signalling information over the traffic channel using a third modulation scheme, wherein the in-band signalling information includes reserved bits indicating at least one or more of a modulation type, a channel coding, or a speech coding used with a transmitted burst.

13. The method of claim 12, wherein the second and the third modulation schemes have the same symbol rate.

14. The method of claim 13, wherein the reserved bits have a predetermined position within the transmitted burst.

15. The method of claim 13, wherein the traffic channel has an associated control channel that uses the third modulation scheme for communicating control information.

16. The method of claim 13, wherein both the second and third modulation schemes are linear modulation schemes.

17. The method of claim 16, wherein the second modulation scheme has a higher level of modulation than the third modulation scheme.

18. The method of claim 17, wherein the third modulation scheme uses a reduced signal set of the second modulation scheme.

19. The method of claim 16, wherein the second and third modulation schemes have the same level of modulation.

20. The method of claim 16, wherein the second modulation scheme and the third modulation scheme use the same pulse shaping.

21. The method of claim 16, wherein the second and third modulation schemes use the same burst format.

22. The method in claim 16, wherein the second and third modulation schemes use the same training sequences.

23. The method in claim 16, wherein the first modulation scheme is a GMSK scheme, the second modulation scheme is a QAM modulation scheme and the third modulation scheme is a QPSK modulation scheme.

24. A method of communication between a mobile station and a base station comprising:

communicating control information over a non-associated control channel using a first modulation scheme;

communicating voice or data over a traffic channel using a second modulation scheme; and initiating a hand-over via an associated control channel using a third modulation scheme.

25. The method of claim 24, wherein the second and the third modulation schemes have the same symbol rate.

26. The method of claim 25, wherein the associated control channel is a fast associated control channel.

27. The method of claim 26, wherein the fast associated control channel is indicated by signalling information that are communicated using the third modulation scheme.

28. The method of claim 25, wherein both the second and third modulation schemes are linear modulation schemes.

29. The method of claim 28, wherein the second modulation scheme has a higher level of modulation than the third modulation scheme.

30. The method of claim 29, wherein the third modulation scheme uses a reduced signal set relative to the second modulation scheme.

31. The method of claim 28, wherein the second and third modulation schemes have the same level.

32. The method of claim 28, wherein the second modulation scheme and the third modulation scheme use the same pulse shaping.

33. The method of claim 28, wherein the second and third modulation schemes use the same burst format.

34. The method in claim 28, wherein the second and third modulation schemes use the same training sequences.

35. The method in claim 28, wherein the first modulation scheme is a GMSK modulation scheme, the second modulation scheme is a QAM modulation scheme and that the third modulation scheme is a QPSK modulation scheme.

36. A method of communication between a base station and a mobile station, comprising the steps of:

transmitting a burst that communicates three sets of information;

modulating a first set of information using a first modulation scheme, wherein the first set of information is control information;

modulating a second set of information using a second modulation scheme that is different from the first modulation scheme, wherein the second set of information is voice and data; and modulating a third set of information using a third modulation scheme that is different from the first and the second modulation schemes, wherein the third set of information is other control information.

37. The method of claim 36, wherein the first modulation scheme is a non-linear modulation scheme and the second and third modulation schemes are linear modulation schemes.

38. The method of claim 36, wherein the second and third modulation schemes have the same symbol rate.

39. The method of claim 37, wherein the second modulation scheme has a higher level of modulation than the third modulation scheme.

40. The method of claim 39, wherein the third modulation scheme uses a reduced signal set of the second modulation scheme to communicate the second set of information.

41. The method of claim 37, wherein the second modulation scheme and the third modulation scheme use the same pulse shaping.

42. The method of claim 37, wherein the second and third modulation schemes use the same burst format.

43. The method in claim 37, wherein the first modulation scheme is a GMSK modulation scheme, the second modulation scheme is a QAM modulation scheme, and the third modulation scheme is a QPSK modulation scheme.

44. The method of claim 36, wherein the control information is control information transmitted over control channels that are not associated with traffic channels, and wherein the other control information is control information transmitted over control channels that are associated with traffic channels.

* * * * *